INVENTORS: JOSEPH MARCOVECCHIO
ARTHUR J. MITTELDORF
BY
Frederick W. Padden
ATTORNEY INVENTORS: JOSEPH MARCOVECCHIO
ARTHUR J. MITTELDORF
BY
*Frederick W. Padden*

ATTORNEY

United States Patent Office 3,442,593
Patented May 6, 1969

3,442,593
POSITIONING APPARATUS FOR WAVELENGTH GATING DEVICES IN SPECTROSCOPIC SYSTEMS
Joseph Marcovecchio, North Plainfield, and Arthur J. Mitteldorf, Scotch Plains, N.J., assignors to Spex Industries, Inc., Metuchen, N.J., a corporation of New Jersey
Filed Dec. 6, 1965, Ser. No. 511,616
Int. Cl. G01j 3/42
U.S. Cl. 356—96                15 Claims This invention relates to ultraviolet, visible and infrared analying systems and particularly to positioning apparatus for such systems. Our invention further relates to apparatus positioning apertured elements at a focal plane of photoelectrically recording spectroscopic equipment.

A variety of instruments is currently available for analyzing the composition, intensity, wavelength or state of polarization of a beam of light with photoelectric, as distinct from photographic, detection. Each such instrument generally utilizes one or more slits or circular apertures for selecting the wavelength dispersed by a grating or prism in a spectrograph and directing the selected radiation to a detector, such as a phototube multiplier. The slit or circular aperture and phototube are generally contained in a light-tight enclosure for permitting room lighting while the equipment is in operation.

A deficiency of such prior art instrument is that no facilities have been available for accurately positioning wavelength gating apertures under dynamic analyzing conditions and while each such aperture is within the light sealed enclosure. Heretofore, the accurate positioning of such aperture has usually been accomplished manually after many openings of the sealed enclosure and numerous alignment measurements. Although such positioning procedures are reliable from a technological viewpoint, it has proven complicated and time consuming.

In view of the foregoing, it is an object of our invention to provide a simple and efficient procedure and facilities for accurately positioning wavelength selecting apertures.

Another object of our invention is to provide facilities for accurately positioning wavelength selecting elements, such as slits and circular apertured devices, of an analyzing instrument while each such element is within a light sealed enclosure.

These and other objects of our invention are attained in a specific exemplary embodiment thereof in a polychromic instrument comprising simple and economical apparatus which provides for the accurate positioning of a plurality of light gating slit elements while such slits are within the light-sealed enclosure of the instrument. This apparatus provides for slit positioning under dynamic conditions and virtually eliminates the need for the many openings of the sealed instrument enclosures as well as numerous alignment measurements heretofore required in the prior art procedures.

In the specific embodiment, a polychromator segment, or accessory, of a spectrometer comprises a light-sealed enclosure for the radiation, or spectral analyzing facilities. This enclosure includes a light-tight aperture for passing light from the spectrometer into the polychromator enclosure. According to my invention, a plurality of slit elements are furnished and each is mounted upon an individual one of a plurality of slit carriages within the enclosure. Each such carriage is arranged upon a pair of guide rods and is selectively movable in each direction along the longitudinal axis of the rods for positioning the slit mounted on that carriage between the light passage and a target area of a prescribed photomultiplier tube of the spectral analyzing facilities.

A single carriage moving mechanism is shared by all of the slit carriages. This mechanism is located below the aforementioned guide rods and carriages and is mounted upon a lead screw and supporting guide arrangement. The moving mechanism includes means for selectively interconnecting a mating slot, or cavity, section in the bottom of each of the slit carriages. This interconnecting means comprises a shaft terminating in a restraining head and an interconnecting tapered head to interfit with the slit carriage cavity. The interconnecting head is inserted and withdrawn from a carriage cavity by a force exerted on the restraining head by a cam, cam support and shaft facilities under control of a lever mechanism at the exterior of the polychromator enclosure. The lead screw arrangement is also rotated from the exterior of the polychromator enclosure by manual or electric motor driving means.

In accordance with our invention, a slit is accurately positioned by actuating the lever mechanism to withdraw the interconnecting head downwardly from the slit carriage cavity. Next, the driving means is activated to rotate the lead screw arrangement whereby the carriage moving mechanism is translated in a direction along the longitudinal axis of the lead screw to a position under the desired one of the slit carriages to be moved. A multi-digit mechanical counter at the exterior of the polychromator denotes the accurate longitudinal position of the carriage moving mechanism. The driving means is then temporarily deactivated and the lever mechanism, is released for inserting the interconnecting head into the cavity of the desired carriage. Afterwards, the driving means again is activated for moving the slit on the desired carriage to a prescribed position between a light admitting pasasge and a target area of a photomultiplier tube. The exact positioning of the slit needed for precision spectral analysis is determined under dynamic analyzing conditions by moving the slit carriage while evaluating the data impinging on the photomultiplier target area and a utilization means. When the optimum slit position is achieved, the driving means is deactivated.

The foregoing and other objects, features and advantages of our invention will be more clearly understood from a reading of the following description of the illustrative embodiment thereof with reference to the drawing in which.

Figure 1:
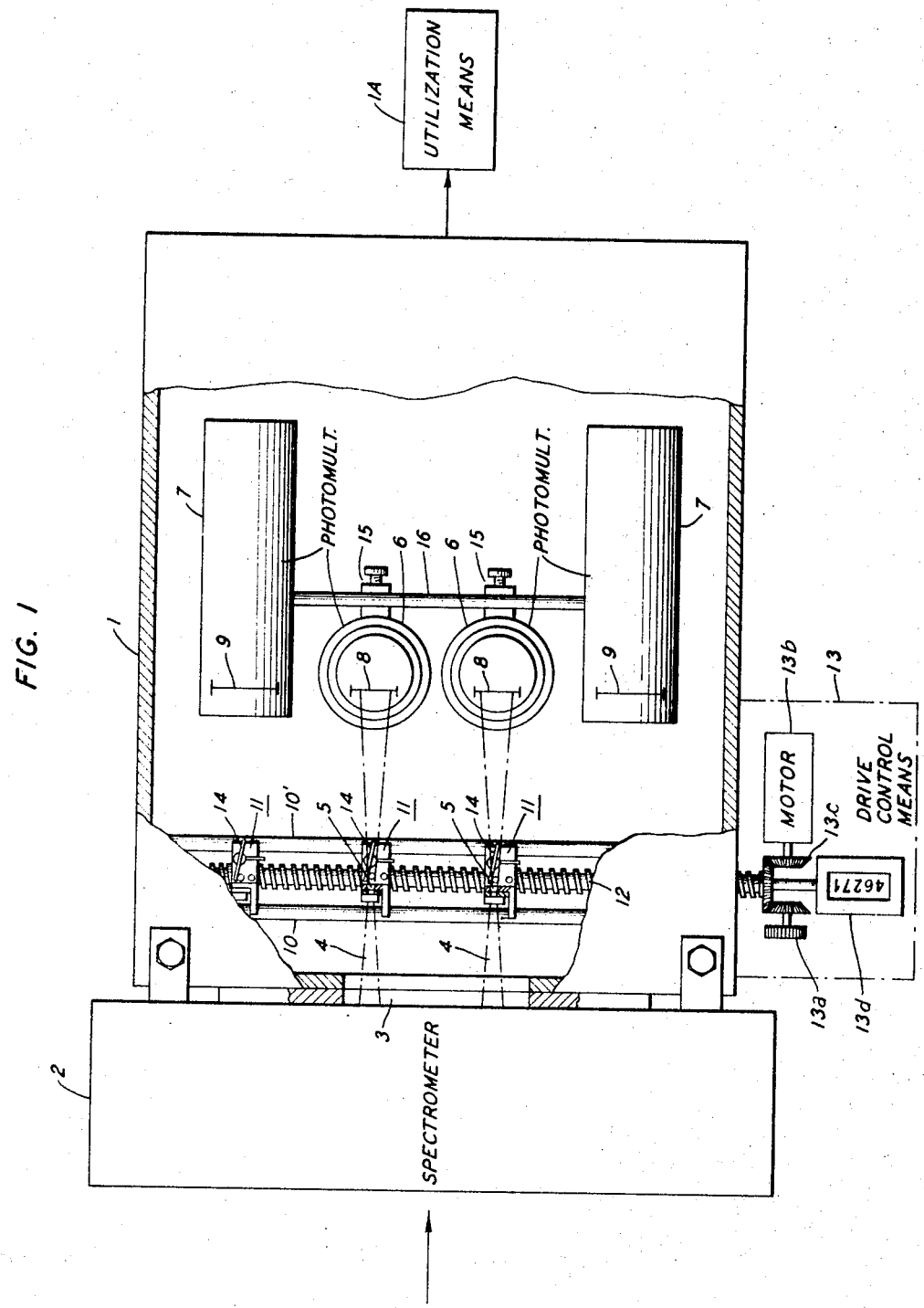
FIG. 1 is a top plan view of the apparatus for selectively positioning each of a plurality of slits between an individual light source from a spectrometer and a phototube associated with a utilization means.

Referring now to FIG. 1 a polychromator enclosure 1 is attached to a spectrometer 2 through a wall having a slot 3 passing radiation, or spectral bundles, to be analyzed from the spectrometer 2 through an individual one of the light gating slits 5 to an individual one of the photomultiplier tubes 6 or 7. Each spectral bundle 4 is focused on one of the slits 5 and, after passing through such slit 5, the rays again diverge and fall upon the target area 8 or 9 of a photomultiplier tube 6 or 7. As is well known, accurate positioning of one of the slits 5 within such a spectral bundle 4 and between the associated passage 3 and the target area 8 or 9 is needed for precise analysis of the radiation characteristics. In addition, a mirror 14 is furnished for selectively deflecting the gated radiation so that the photomultiplier need not be in a straight alignment with a slit 5 and a prescribed spectral bundle. Advantageously, the mirror 14 is used when adjacent photomultiplier tubes are positioned within close proximity to one another and, because of their physical characteristics, a mirror 14 is needed for deflecting gated light to the desired photomultiplier target area.

In accordance with my invention, the polychromator segment 1 is light-tight, or sealed, except as to spectral bundles 4 and is equipped with a mechanism including guides 10 and 10′, slit and mirror carriage 11, lead screw 12, and drive control means 13 for driving screw 12 selectively to position any one of the slits 5 and mirrors 14 at a precise position within a spectral bundle 4 and between a passage, or slot 3 and a grid 8 or 9. Polychromator 1 is further equipped with facilities, for example a cover (not shown), for enabling a person initially to open the sealed instrument enclosure for placing any one of the tubes 6 or 7 at the approximate position needed for the desired light analysis. Tubes 6 and 7 are, by way of illustration, so-called side and end window photomultiplier tubes, respectively, each of which is a detection device for a different spectral bundle and, accordingly, has a target area 8 or 9 in a prescribed vertical or horizontal plane. Each tube 6 is furnished with adjustable clamping means 15 for containing that tube at a desired position on the guide rod 16. Similar facilities (not shown) are used in polychromator 1 for positioning each of the tubes 7. The tubes 6 and 7 are part of the analyzing facilities of polychromator 1 which supply analysis information to the utilization means 1A.

After the desired tube or tubes 6 or 7 have been positioned, the polychromator cover (not shown) is closed to provide a light-tight seal, as previously explained. Operating power may then be applied to the polychromator accessory 1 and an appropriate slit 5 positioned under control of the beveled gears 13c and either the motor 13b or knob 13a, under dynamic conditions as hereinafter described. A mechanical counter 13d indicates the position of the slit and mirror carriage 11 by way of illustration in hundreds of a millimeter.

Figure 2:
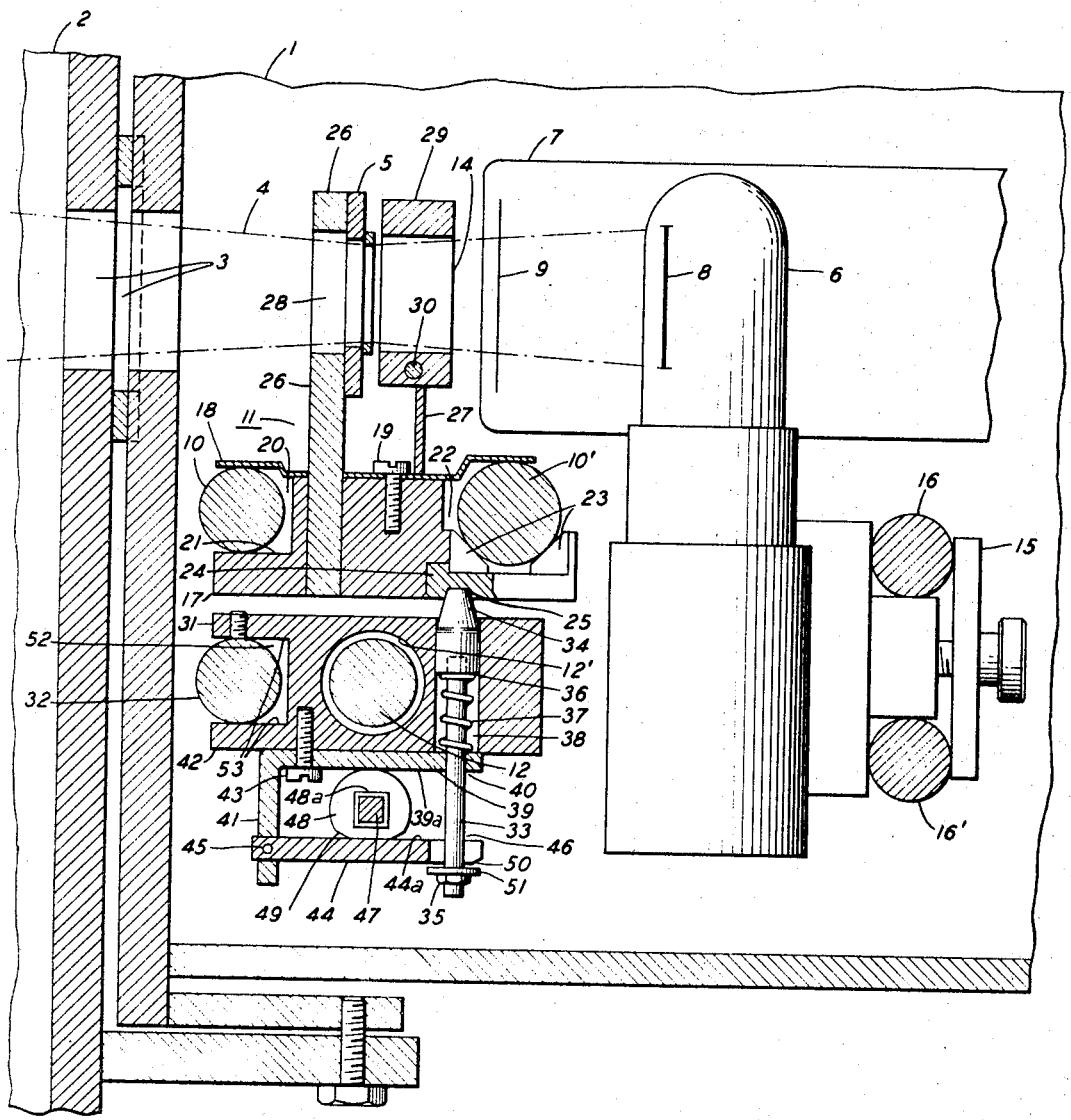
FIG. 2 is a view partly in vertical cross section and partly in side elevation showing in greater detail the positioning apparatus illustrated in FIG. 1.

Turning now to FIG. 2, a light-sealed passage 3 is depicted between a spectrometer 2 and a spectral analyzing polychromator accessory 1 for passing of spectral bundle 4 to be analyzed from the spectrometer 2 through a slit 5 toward a target area 8 or 9 of a photomultiplier tube 6 or 7. The slit 5 is mounted upon a carriage 11 which is slidably associated with a pair of guides 10 and 10′. Carriage 11 comprises a support element 17 and a spring clamp member 18 fastened together about the guides 10 and 10′ by a threaded fastener means 19. Guide 10 interfits with a compartment or slot 20 in support 17. Slot 20 includes a floor surface 21 and provides a force such that frictional forces are generated between the guide 10 and clamp 18 and between guide 10 and surface 21.

Opposite slot 20, support 17 includes another slot 22 having two wedge-shaped surfaces 23. Guide 10′ is contained within slot 22 by clamp 18 which provides frictional forces between itself and guide 10′ and between guide 10′ and the wedge surfaces 23. Beneath these surfaces 21, support 17 includes a member 24 having an interconnector cavity 25 therein. The functions of this cavity 25 are described hereinafter.

Support 17 includes posts 26 and 27 extending upwardly from and perpendicular to the clamp 18. Mounted upon the post 26 is a slit 5. Post 26 has an aperture 28 for passing a spectral bundle 4 from passage 3 toward slit 5. Aperture 28 and slit 5 are in alignment for passing light 4 from passage 3 toward a target area 8 or 9. The post 27 supports a mirror positioning means 29 including a lever 30 and upon which is mounted a mirror 14. Lever 30 is rotatable about post 27 for controlling the positioning means 29 whereby mirror 14 is positioned to pass or deflect a gated spectral bundle 4 in the illuminated slit 5 to a target area 8 or 9.

Accessory 1 further is equipped with a carriage moving mechanism comprising a support member 31 movably associated with a guide rod 32 and the lead screw 12 which are mounted below the guides 10 and 10′. Support member 31 includes a threaded nut section 12′ which complements and interfits with the lead screw 12 for the traverse movement of support 31 along the longitudinal axis of screw 12. Support 31 further comprises means for selectively interconnecting the support 31 with the support 17. This interconnecting means comprises a bolt, or shaft, member 33 having an interconnecting head 34 and a restraining head 35. Interconnecting head 34 is shaped on its upwardly projecting side to complement and interfit with the cavity 25 in member 24. Head 34 also includes a bearing surface 36 against which a coil spring 37 presses.

Shaft 33 is contained within a bore 38 in the support 31. The latter further includes a plate 39 having a hole 40 through which the shaft 33 extends. The diameter of bore 38 is larger than the hole 40 thereby exposing the adjacent edges of the hole 40 to the bore 38. Spring 37 interacts between the bearing surface 36 of head 34 and the adjacent edges of hole 40 to springload the shaft 33 within bore 38. The result thereof is to urge the head 34 of shaft 33 toward the cavity 25 in member 24.

Plate 39 has an extension member 41 extending downwardly from a surface 42 of support member 31. Plate 39 is fastened to the lower surface 42 of support member 31 by means of a threaded fastener 43. Extension 41 has pivotally mounted thereon a cam support 44. The latter is attached to extension 41 by means of a pivot or axle 45. On its extended end from axle 45, support 44 includes an aperture 46 through which is extended the shaft 33. The diameter of aperture 46 is smaller than the diameter of head 35 whereby the shaft 33 of the interconnecting means may be controlled and moved in a direction parallel to the longitudinal axis of shaft 33 by the movement of the cam support 44.

A cam 48, substantially circular in form, is located between the facing surfaces 44a and 39a of support 44 and plate 39, a driving member 47, substantially rectangular in form extends through an aperture 48a in cam 48 whereby cam 48 is slidable along the longitudinal axis of member 47. Cam 48 includes a cam surface 49 which is adjacent to and in contact with the cam support 44. The rotation of member 47, controlled by a lever outside of the light-tight enclosure 1, actuates cam 48 and controllably urges the cam support 44 in a direction in which the lower surface 50 thereof contacts a shoulder 51 of head 35 to move shaft 33 in a direction parallel to its longitudinal axis whereby head 34 is urged away from the cavity 25 in member 24. FIG. 2 shows the head 34 in a position of engagement with cavity 25.

Guide rod 32 interfits with a slot 52 of support 31. Slot 52 includes walled surfaces 53 for containing rod 32 and enabling support 31 to be movable in a direction parallel to the longitudinal axis of rod 32 as explained hereinafter.

Figure 3:
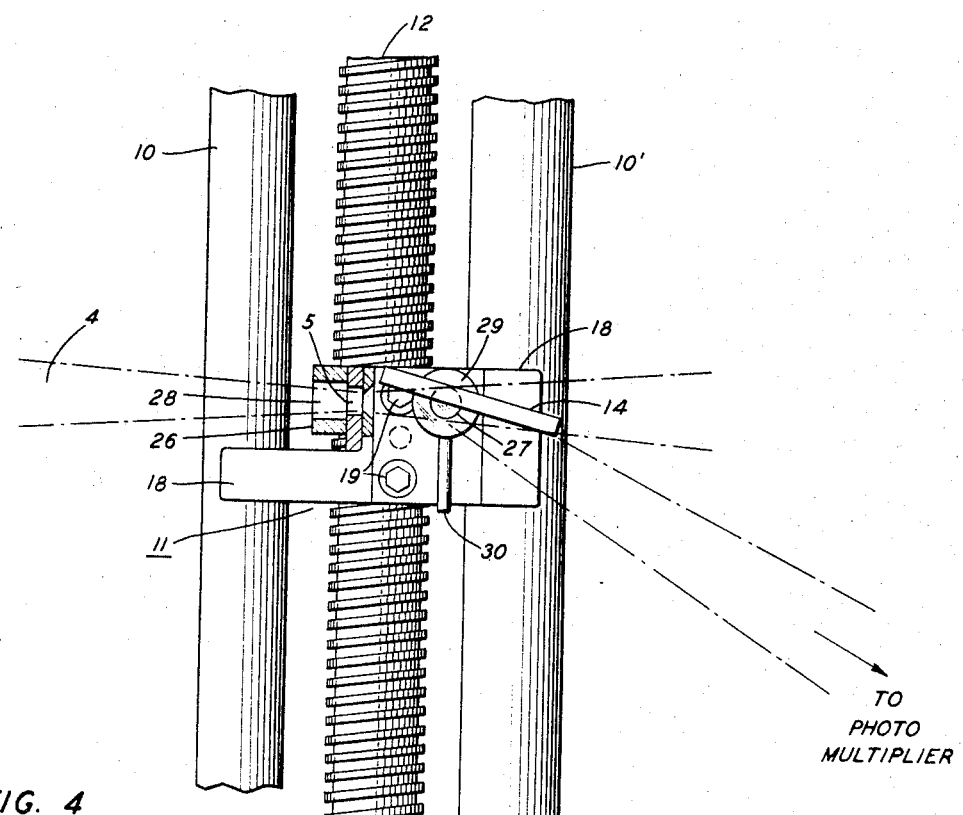
FIG. 3 is a detailed plan view of a slit and mirror carriage associated with guide rods and a lead screw of the positioning apparatus depicted in FIG. 2.

In FIG. 3, a top view is shown of the slit and mirror carriage 11 in association with the guides 10 and 10′ and the lead screw 12. Clamp 18 and the threaded fasteners 19 are depicted for fastening support 17 of FIG. 2 to clamp 18. Post 26 is shown with the aperture 28 aligned with both the slit 5 and mirror 14. The lever 30 of the mirror positioning means 29 is rotatable about the post 27 for selectively moving the mirror 14 thus to deflect a spectral bundle 4 toward a photomultiplier 6 or 7 after it passes through the illuminated slit 5.

Figure 4:
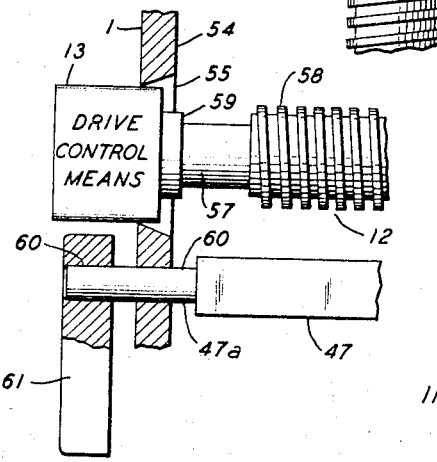
FIG. 4 depicts a cam lever mechanism and lead screw coupling apparatus.

FIG. 4 shows a side wall 54 of the instrument 1. Wall 54 includes an aperture 55 in which a drive control means 13 is mounted so as to form a light-tight seal for instrument 1. The lead screw 12 comprises a shaft 57 contiguous to the threaded segment 58 of screw 12 and having a diameter smaller than the threaded segment 58. A drive coupler 59 is interposed between the drive means 13 and the shaft 57. The diameter of shaft 57 is smaller than that of the coupler 59 which is secured thereto for coupling a driving force from the drive means 13 to the lead screw 12. The drive means 13 is shown in block diagram form in FIG. 4 and advantageously comprises available electric motor 13b, manually actuatable vernier knob 13a and bevel gears 13c for controlling the coupler 59 to rotate the lead screw 12. In addition, drive means 13 includes a calibrated measuring element 13d, such as a mechanical counter or micrometer for measuring and signifying the position of a slit and mirror carriage 11 upon the screw 12.

Side wall 54 also includes an opening 60 of generally circular shape. The cam driving member 47 has a substantially circular shaft element 47a which is contiguous with the rectangular segment of member 47. Element 47a extends through the opening 60, the adjacent edges of which form a light-tight seal about member 47. A lever 61 is shaped with a cavity 62 which complements and interfits with the shaft element 47a.

The interrelation and operation of the illustrative embodiment of our invention will now be described with reference to FIGS. 1 to 4. It is assumed that the photomultiplier tubes 6 and 7 have been positioned, as previously explained that instrument 1 is sealed against all light except that which is admitted through passage 3 as illustrated in FIG. 1 and that the drive control means 13 is an idle state. Initially, lever 61 of FIG. 4 is turned to rotate the driving member 47 whereby the cam 48 in FIG. 2 exerts a force upon the cam support 44. As a consequence, support 44 pivots downwardly about axle 45 to force the lower surface 50 of support 44 against shoulder 51 of head 35 and thereby to move the shaft 33 downward in a direction parallel to its longitudinal axis for urging head 34 out of a cavity 25 in a member 24 of a carriage 11.

Next, the drive control means 13, including the motor 13b, knob 13a and gears 13c, are operated from their idle state to rotate the coupler 59 and the lead screw 12 whereby the support member 31, extension 41, cam support 44, cam 48 and the interconnecting means including shaft 33 and head 34 are translated along guide rod 32 and lead screw 12 in a direction parallel to its longitudinal axis and to a prescribed position under a desired one of the slit and mirror carriages 11. The latter position may be signified by the aforementioned calibrated measuring element 13d of FIG. 1. The drive means 13 may then be restored to its idle state. Lever 61 of FIG. 4 then is released to withdraw the force between the cam surface 49 and support 44 for enabling the spring 37 to interact between the bearing surface 36 of head 34 and the adjacent edges of hole 40, thus to urge the head 34 of shaft 33 into a cavity 25 in the member 24 of the desired one of the slit carriages 11. The latter carriage is then prepared to be moved along guides 10 and 10' under control of the interconnecting means of support 31.

Drive means 13 is thereafter again operative from its idle state for rotating coupler 59 and lead screw 12 whereby support member 31 is moved along lead screw 12 in a direction parallel to its longitudinal axis. As a result, the interconnecting means including head 34 of support 31 exerts a force within cavity 25 of the desired one of the carriages 11 for moving it along the guides 10 and 10' in the appropriate direction parallel to the longitudinal axis of the latter guides. Accordingly, the slit 5 mounted upon the desired one of the carriages 11 is moved into the precise position required for analyzing the spectral bundle gated by that slit. The latter position is determined under dynamic conditions with the aid of output information from the utilization means. The latter information, for example in the form of minimum-maximum energy readings, signifies when the slit 5 and/or mirror 14 are accurately aligned for directing the spectral bundle 4 to the target 8 or 9 of the appropriate photomultiplier 6 or 7. When the correct positioning of the slit is achieved, the drive means 13 is deactivated.

It is also to be understood that the herein described arrangements are illustrative of the application of the principles of the present invention. Numerous other arrangements may be devised by those skilled in the art without departing from the spirit and scope of our invention.

What is claimed is:

1. In a spectroscopic system having a light-tight polychromator enclosure with an entrance aperture for passing a spectral bundle from a spectrometer, said enclosure comprising a plurality of elements for gating prescribed wavelengths of said spectral bundle;
   a pair of guide rods;
   a plurality of carriages for carrying said gating elements along the longitudinal axes of said rods each comprising;
      a first slot means for containing a first one of said rods,
      a second slot means for containing the other one of said rods,
      and interconnector means engageable for carriage movement along the longitudinal axes of said rods;
      and a carriage moving means mounted for movement parallel to said rods comprising means for selectively and exclusively engaging said interconnector means of any selected one of said carriages,
      and translating means operable for moving said engaging means and the selected one of said carriages along the longitudinal axes of said rods.

2. The combination in accordance with claim 1 wherein said interconnector means of each of said carriages comprises a member having a cavity, and said engaging means comprises
   a shaft element having an interconnecting head shaped to interfit selectively with any of said cavities,
   spring means,
   means for containing said shaft element and spring means to springload said shaft element thereby to urge said interconnecting head toward said cavities,
   and urging means controllable for urging said shaft element against said spring means in a direction whereby said interconnecting head is withdrawn away from each of said cavities.

3. The combination in accordance with claim 2 wherein said containing means comprises
   a support member having a bore for containing said shaft element and said spring means,
   a plate having a hole through which said shaft element extends,
   said bore being of larger diameter than the diameter of said plate hole thus exposing adjacent edges of said hole to said bore,
   said interconnecting head of said shaft having a bearing surface,
   and said spring interacting between said bearing surface and said adjacent edges to spring-load said shaft element within said bore thereby to urge said interconnecting head in a direction toward said cavities.

4. The combination in accordance with claim 3 wherein said shaft element further comprises a restraining head having a shoulder;
   and said urging means comprises an extension member pivotably mounted on said support member and having an aperture through which said shaft element extends, said aperture being of smaller diameter than the diameter of said restraining head, and a control device for pivoting said extension member to urge it against said restraining head shoulder thus to move said shaft element whereby said interconnecting head is withdrawn away from said cavities.

5. The combination in accordance with claim 4 wherein said control device comprises
   a rotatable cam shaft member,
   a cam substantially circular in form and slidably mounted on said cam shaft member and including a cam surface which is in contact with said extension member and is responsive to the rotation of said cam shaft member for pivoting said extension member to urge it against said restraining head shoulder thus to move said shaft element whereby said interconnecting head is withdrawn away from said cavities.

6. The combination in accordance with claim 5 wherein said translating means comprises
    a nut device affixed to said support member,
    a rotatable lead screw cooperating with said nut device,
    and means for rotating said lead screw whereby it cooperates with said nut device to move said support member
    and a selected one of said carriages interconnectable therewith along the longitudinal axis of said lead screw.

7. The combination in accordance with claim 6 wherein said rotating means comprises
    a bevel gear arrangement coupled to said lead screw for controlling the rotation of said screw,
    and further comprising a mechanism coupled to said gear arrangement for indicating the position of said support member on said lead screw.

8. In a spectroscopic system having a light-tight polychromator enclosure with an entrance aperture for passing a spectral bundle from a spectrometer into the polychromator enclosure, said enclosure comprising a plurality of elements each having a slit section for gating prescribed wavelengths of said spectral bundle;
    first and second guide rods each having a longitudinal axis;
    a plurality of carriages for carrying said gating slit elements along said longitudinal axes of said rods,
        each of said carriages comprising a support device having an upper surface structure supporting an individual one of said elements, a first compartment for containing said first rod and a second compartment for containing said second rod;
    transporting means mounted below said carriages for selectively and exclusively moving any one of a selected one of said carriages along said longitudinal axes of said first and second rods;
    and means located outside of said polychromator enclosure for operating said transporting means to move a selected one of said carriages along said longitudinal axis of said rods.

9. The invention set forth in claim 8 wherein each of said carriages further comprises a spring clamp member,
    a spring clamp member,
    a threaded fastener fastening said clamp member to said support device whereby frictional forces are generated between said first rod and said clamp member and between said first rod and said first compartment as well as between said second rod and said clamp member and between said second rod and said second compartment.

10. The invention set forth in claim 9 wherein said transporting means comprises
    a third guide rod having a longitudinal axis substantially parallel to said axes of said first and second rods,
    a rotatable lead screw,
    and a support member having a slot for containing said third rod and a threaded nut segment which interfits with said lead screw for cooperating with the rotation of said screw to move said support member along the longitudinal axis of said third rod and any selected one of said carriages along the longitudinal axes of said first and second rods.

11. The invention set forth in claim 10 wherein each of said support devices further comprises a lower surface including a member having a cavity;
    and wherein said support member further comprises means for selectively interconnecting said support member with any one of said support devices, said interconnecting means including
        a bolt element having an interconnecting head shaped on its upwardly projecting side to complement and interfit with any of said cavities in said support devices,
        a coil spring mounted about said bolt and a bore for containing said bolt and spring;
        said interconnecting head having a bearing surface against which said spring presses;
        said transporting means further comprising a plate having a hole through which said bolt extends,
        said bore having a diameter larger than said plate hole thereby exposing the adjacent edges of said hole to said bore,
        said spring interacting between said bearing surface and said adjacent edges to spring-load said bolt within said bore thereby to urge said interconnecting head upwardly toward said cavities,
        said plate having an extension member extending downwardly from said support member,
        and another threaded fastener fastening said plate to said support member.

12. The invention set forth in claim 11 wherein said bolt element further comprises a restraining head;
    said transporting means further comprises
        a cam support having an aperture through which said bolt extends and the diameter of said aperture being smaller than the diameter of said restraining head whereby said bolt is movable in a direction parallel to its longitudinal axis by the movement of said cam support;
        axle means for pivotally mounting said cam support to said extension member,
        a cam driving member of substantially rectangular shape mounted below said lead screw and having a longitudinal axis parallel to said lead screw longitudinal axis,
        and a cam substantially circular in form and slidably mounted on said cam driving member and between said plate and cam support;
        and said operating means outside of said polychromator enclosure comprising lever means for rotating said cam driving member controllably to urge said cam support against said restraining head thereby to move said bolt in a direction along its longitudinal axis whereby said interconnecting head is urged downwardly away from each of said cavities.

13. The invention set forth in claim 12 wherein said operating means further comprises drive control means including
    a bevel gear arrangement coupled by means of a light-tight passage to said lead screw and controllable by a motor and manual adjustment means for rotating said lead screw whereby it cooperates with said threaded nut segment for moving said support member along the longitudinal axis of said lead screw to a position in which said interconnecting head can interfit with said cavity of any selected one of said carriages,
    and a mechanical counter coupled to said lead screw for indicating the position of said support member on the longitudinal axis of said lead screw.

14. The invention set forth in claim 13 wherein said rotating means is subsequently operable for rotating said cam driving member to move said cam support and said bolt in a direction whereby said interconnecting head is urged upwardly into said cavity of a selected one of said carriages;
    a plurality of photomultiplier tubes each having a target area for receiving a spectral bundle gated through a slit element,
    and said drive control means being thereafter operable for rotating said lead screw whereby it cooperates with said threaded nut segment for moving said support member and the selected one of said carriages interconnected therewith to a desired position along the longitudinal axis of said screw for enabling the slit element supported on the last-mentioned one of said carriages to gate a spectral bundle onto the target area of a prescribed one of said tubes.

15. The invention set forth in claim 14 further comprising a plurality of mirrors and wherein said support device of each of said carriages further comprises a post structure interposed between said upper surface structure of the same carriage and said photomultiplier tubes, and means rotatably mounting an individual one of said mirrors to said post structure.

References Cited

UNITED STATES PATENTS

| | | | |
|---|---|---|---|
| 2,446,874 | 8/1948 | Geffner et al. | |
| 2,613,541 | 10/1952 | Crossley | 74—59 |
| 2,686,894 | 8/1954 | Mathieu. | |
| 2,803,986 | 8/1957 | Chomiere et al. | |
| 2,837,959 | 6/1958 | Saunderson et al. | |
| 3,216,678 | 11/1965 | Foedisch. | |
| 3,337,732 | 8/1967 | Opocensky | 74—424.8 X |

FOREIGN PATENTS 1,008,939  11/1965  Great Britain.

RONALD L. WIBERT, *Primary Examiner.*

F. L. EVANS, *Assistant Examiner.*

U.S. Cl. X.R.

74—89.15, 424.8